United States Patent [19]
Mitchell

[11] Patent Number: 5,320,310
[45] Date of Patent: Jun. 14, 1994

[54] ARTICULATED WING MECHANISM

[75] Inventor: Steven D. Mitchell, Benbrook, Tex.

[73] Assignee: The Windward Projects, Fort Worth, Tex.

[21] Appl. No.: 21,849

[22] Filed: Feb. 24, 1993

[51] Int. Cl.[5] .......................... B64C 9/08; B64C 3/48; B64C 3/56; B63H 9/08
[52] U.S. Cl. .................................. 244/219; 244/201; 244/218; 244/49; 114/102; 114/103
[58] Field of Search ............... 244/201, 213, 214, 215, 244/218, 219, 49; 114/102, 103, 97

[56] References Cited

U.S. PATENT DOCUMENTS

| | | | |
|---|---|---|---|
| 4,159,086 | 6/1979 | Schonfelder | 244/49 |
| 4,280,428 | 7/1981 | Werner, Jr. | |
| 4,402,277 | 9/1983 | Wainwright | 114/103 |
| 4,432,298 | 2/1984 | Cudmore | 114/103 |
| 4,530,301 | 7/1985 | Latham | |
| 4,582,278 | 4/1986 | Ferguson | 244/214 |
| 4,604,959 | 8/1986 | Menear | 114/97 |
| 4,669,407 | 6/1987 | Cobb | |
| 4,685,410 | 8/1987 | Fuller | |
| 4,848,258 | 7/1989 | Priebe | 114/102 |

FOREIGN PATENT DOCUMENTS

| | | | |
|---|---|---|---|
| 4002972 | 8/1991 | Fed. Rep. of Germany | 244/219 |
| 84295 | 5/1982 | Japan | 114/103 |

Primary Examiner—Michael S. Huppert
Assistant Examiner—Virna Lissi Ansley
Attorney, Agent, or Firm—Richard C. Litman

[57] ABSTRACT

An articulated wing has a fore wing portion and after wing portion connected to an articulate axis support structure which extends along the length of the wing and separates the two wing portions. Control actuators separately connect the fore and after wing portions to the articulate wing support structure in order to provide separate angular positioning capabilities for the two wing portions. Further, the articulate wing support structure itself may be rotated with respect to the mechanism it is attached to. These and other flexible controls over the wing attitude and size allow the wing to provide a number of force vector amplitudes as well as directions for any given fluid flow direction and velocity.

20 Claims, 7 Drawing Sheets

ARTICULATED WING MECHANISM

BACKGROUND OF THE INVENTION

1. Field of the Invention

The present invention relates to wing mechanisms for altering fluid flow. More particularly, the present invention pertains to articulated wing mechanisms having variable wing surface areas and independently controllable boom actuators to vary the angle between the fore wing and after wing, as well as the surface areas of said wings, in order to optimize lift for various fluid flow velocities.

2. Description of the Prior Art

U.S. Pat. No. 4,530,301 issued Jul. 23, 1985 to Ronald D. Latham discloses a variable camber airfoil for a vessel consisting of a flaccid fabric attached to a rigid leading edge with the ability of moving from side to side for efficient entry into the wind.

U.S. Pat. No. 4,685,410 issued Aug. 11, 1987 to Robert R. Fuller discloses a wing with a variable surface area. The wing has a front and rear airfoil coupled so that a rotation of the front airfoil produces a counter rotation of the rear airfoil.

U.S. Pat. No. 4,280,428 issued Jul. 28, 1981 to John Werner, Jr. discloses a sailing vessel with adjustable sails for providing lift in addition to thrust.

U.S. Pat. No. 4,669,407 issued Jun. 2, 1987 to Ronald E. Cobb discloses a telescopic boom mask with front and rear sails.

None of the above inventions and patents, taken either singly or in combination, is seen to describe the instant invention as claimed.

SUMMARY OF THE INVENTION

The articulated wing design of the present invention produces greater forces acting on the wing than the conventional single piece wing design by varying the angle between a fore boom and an after boom of the wing, thereby allowing for the adjustment of the angle therebetween to produce an optimized wing shape for any given fluid flow rate around the wing. An articulation axis support structure extends along the length of the wing and separates the fore boom and after boom. The support structure is attached at one longitudinal end to the mechanism on which the wing acts upon. The fore boom is attached to a leading edge deflector at a front end thereof and to the support structure at a back end thereof. The front end of the after boom is attached to the support structure. Both the fore boom and the after boom have control actuators attached to the support structure for independently rotating them about the length of the support structure. Further, there is an actuator which moves the support structure relative to the mechanism to which the wing is attached.

Accordingly, it is a principal object of the invention to provide an articulated wing mechanism for independently controlling a fore boom and an after boom so as to vary the angle therebetween.

It is another object of the invention to attach the fore and after booms to an articulated axis support structure which can be rotated to change the relationship between the direction of fluid flow and the planar surface of the wing surfaces.

It is a further object of the invention to adjust the angular relationship of the articulated axis support structure relative to the mechanism the wing is attached to, as well as independently adjust the after and fore booms, so as to obtain the maximum lift for a given fluid flow rate.

Still another object of the invention is to means for adjusting the length and width of the wing so as to obtain the desirable lift characteristics for various fluid flow rates.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
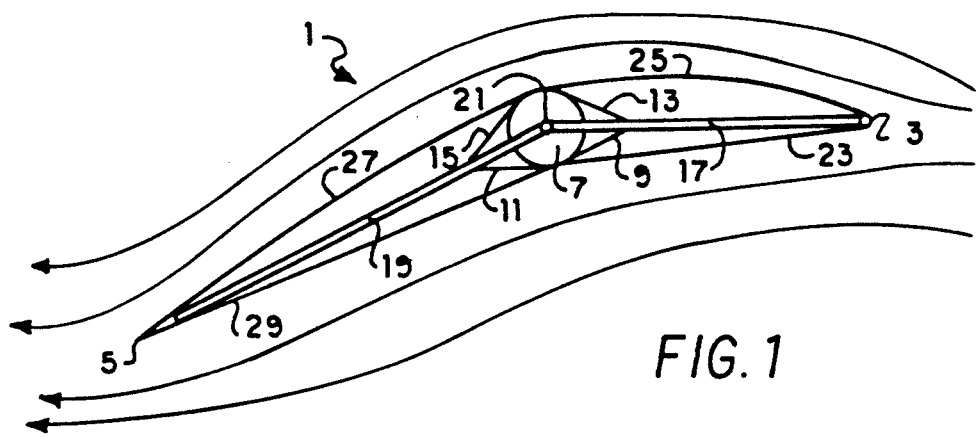
FIG. 1 is a side view of the wing of a first embodiment of the present invention using both lift and pressure surfaces.

As shown in FIG. 1, the articulated wing mechanism 1 of the present invention has a negative pressure surface extending over the top of the wing and a positive pressure surface extending along the bottom of the wing. The negative pressure surface consists of a front portion thereof being an upper wing portion 25 and a rear portion thereof being a rear upper wing portion 27. The positive pressure surface consists of a front portion thereof being a front lower wing portion 23 and rear portion thereof being a lower wing portion 29. The front wing portions 23 and 25 are connected at front ends thereof to a leading edge deflector 3 and at a back end thereof to a articulate axis support structure 7. The leading edge deflector 3 is connected to the front of the fore boom 17. The rear of the fore boom 17 is connected to the articulate axis support structure 7 through a pivotal connection 21. The front of the after boom 19 is also connected at the pivotal connection 21. The rear upper and lower portions 27 and 29, respectively, are connected in front to the articulate axis support structure 7 and in back to a trailing edge portion 5 of the after boom 19.

As shown in FIG. 1, the fore boom 17 is attached to two control actuators 9 and 13 and the after boom 19 is attached to two control actuator 11 and 15. In the preferred embodiment, these control actuators are hydraulic cylinders which may be expanded or retracted as disclosed by Fuller U.S. Pat. No. 4,685,410, made of record and incorporated herein by reference. However, the control actuators could also include any electrical, mechanical, or hybrid devices sufficient for the stated purpose. Examples are, pneumatic drives or electromagnetic servo mechanisms. For example, if the control actuator 13 were expanded and the control actuator 9 were retracted, then the fore wing would rotate in the clockwise direction about the articulate axis support structure 7. Likewise, if control actuator 11 were retracted and control actuator 15 were expanded, then the after wing would rotate in the counter clockwise direction. By controlling actuators 13 and 9 independently from 11 and 15, any desired relative angle between the fore and after wing can be achieved. If the angle between the fore and after wing were decreased as measure from the pressure surfaces 23 and 29 by controlling the actuators 9, 11, 13 and 15 as discussed above, the fluid flow would have a greater deviation along the lift surfaces 23 and 29, resulting in an increase of the fluid velocity and greater lift.

Figure 2:
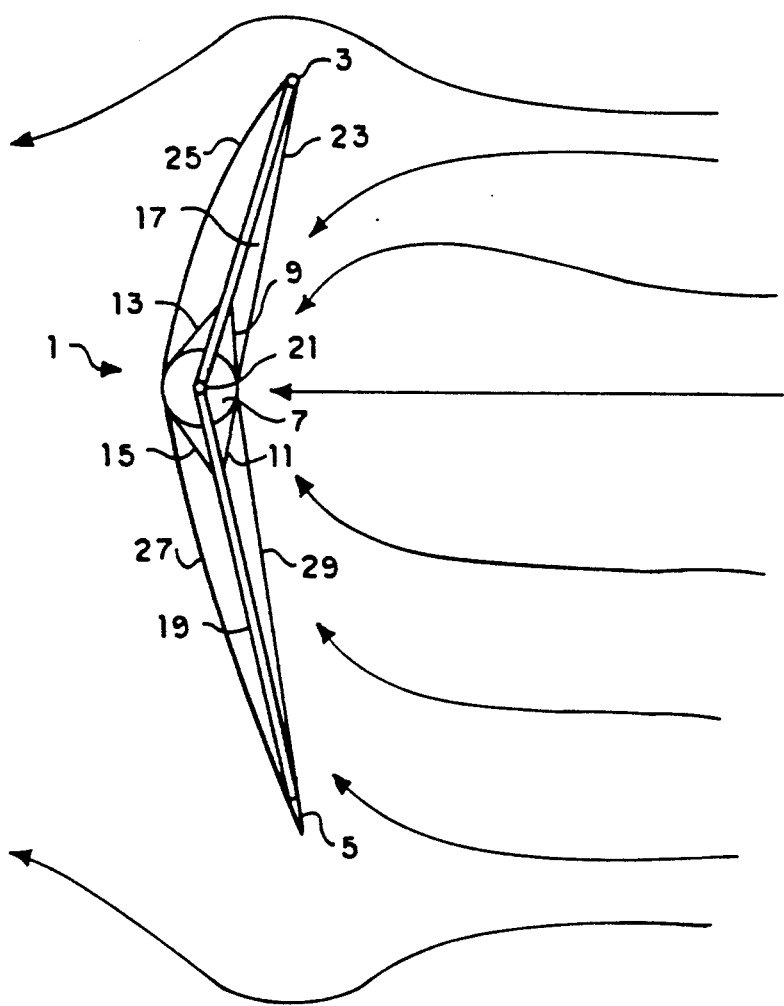
FIG. 2 is a side view of the wing of the first embodiment of the present invention used as a push fluid collector.
Figure 3:
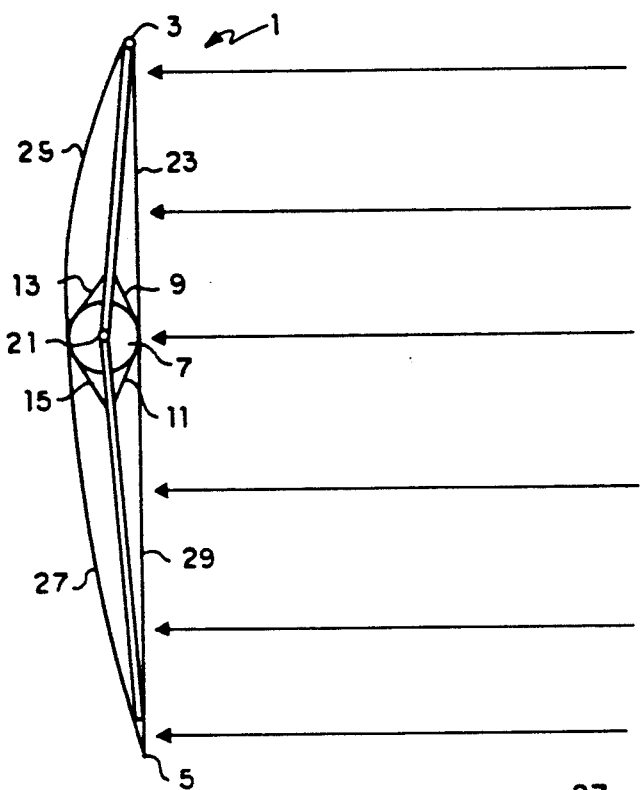
FIG. 3 is a side view of the wing of the first embodiment of the present invention used as a push non-collector.

As shown in FIG. 2, and as mentioned above, the articulate wing mechanism 1 may be rotated with respect to the mechanism to which it is attached, e.g. a sail boat. This can be achieved by any known manner such as disclosed by Fuller. In FIG. 2, the wing 1 is cupped so as to form a scoop collector to prevent spillage of the fluid force around the pressure surface 23 and 29. In contrast, as the wing 1 could act as a push surface without acting as a collector of fluid force as shown in FIG. 3.

Figure 4:
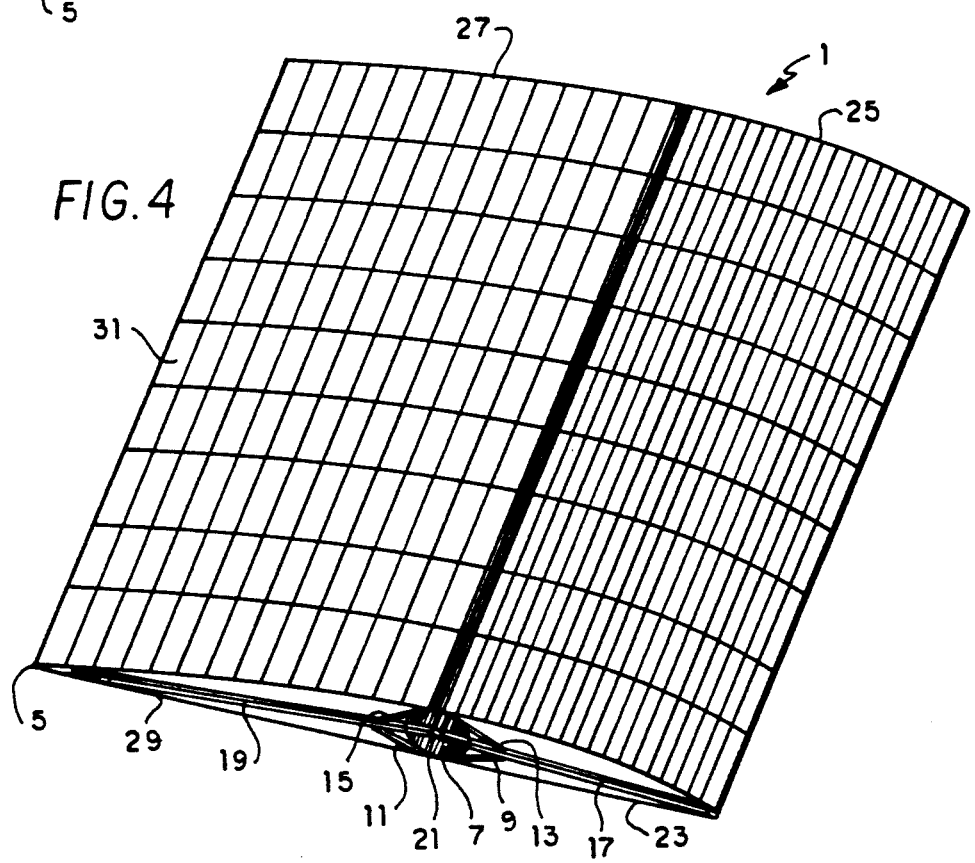
FIG. 4 is a top perspective view of the wing of the first embodiment of the present invention.

As shown in FIG. 4, the wing 1 may consist of a plurality of solid sheets 31 of metal, plastic, or other suitable solid materials which overlap one another. In this manner the articulate wing mechanism 1 may be expanded along its length or width. It can be expanded along its length by increasing the length of the articulate axis support structure 7. Again, this can be accomplished by hydraulic cylinders or the like. The fore and after booms 17 and 19 could also be expanded to increase the width of the wing 1 in a similar manner. Overlapping of the solid sheets 31 can be accomplished in any known manner, such as disclosed by Fuller. In this manner, the fore boom 17 can be lengthened so as to function as the after boom and the after boom 19 can be shortened so as to function as the fore boom. The process of shortening one boom and lengthening the other serves to account for any changes or reversals in the direction of fluid flow.

In a second embodiment of the present invention, the articulate wing mechanism 40 is triangular in shape. The fore boom 41 and after boom 42 are each independently expandable and retractable and may be rotated about the articulate axis support structure 43 in the same manner as discussed above for the first embodiment. The articulate axis support structure 43 is also expandable. The leading edge 44 is attached at one end to the top of the articulate axis support 43 and at the other end to the front end of the fore boom 41. The trailing edge is attached at one end to the articulate axis support structure 43 and at the other end to the back of the after boom 42. The wing surfaces are preferably made of a flexible material. In this manner, the surface area of the wing (not shown) may be varied as the booms are expanded and retracted. Surface material is taken up or let out during these adjustments.

The taking up or letting out of material can be achieved either at the leading edge 44 or at the articulate axis support structure 43 and also at the trailing edge 45. Typical methods such as reefing the leading surface, pulling the material through an open slot in the articulate axis support structure 43, or utilizing telescopic surfaces could be used to obtain variable surface areas for the articulate wing mechanism 40.

Figure 5:
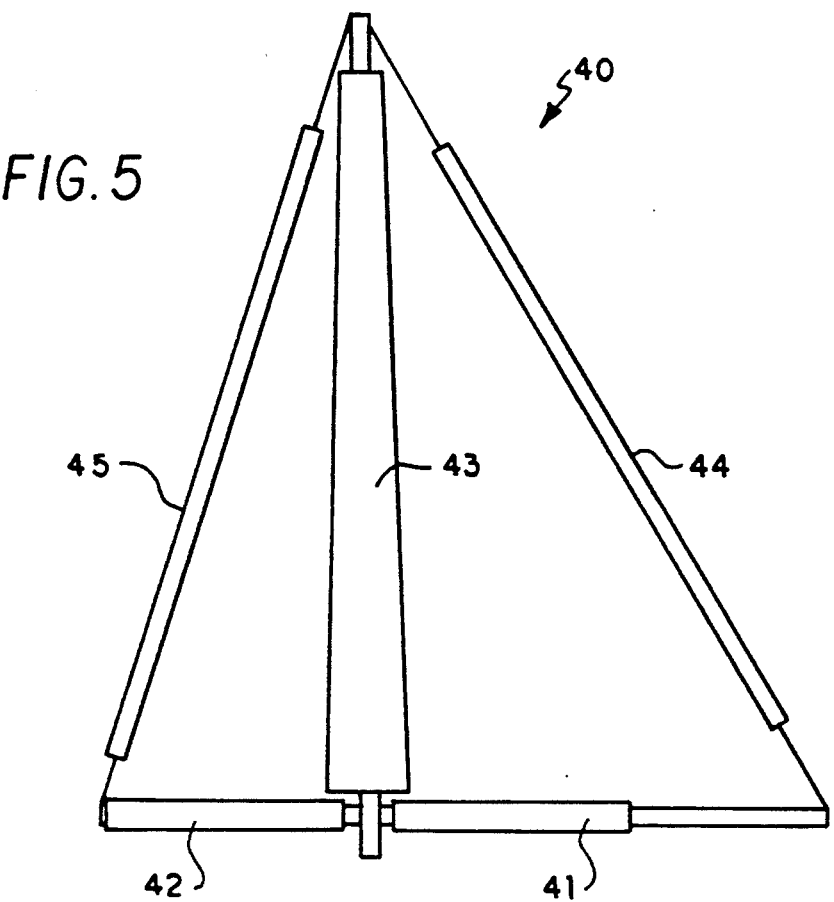
FIG. 5 is a side view of a second embodiment of the present invention.
Figure 6:
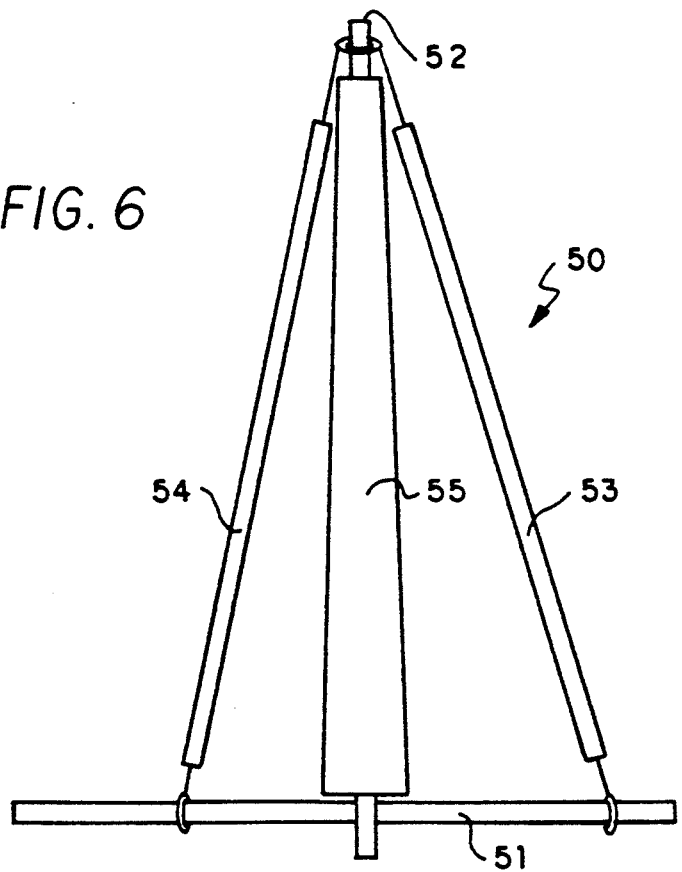
FIG. 6 is a side view of a third embodiment of the present invention.

In the embodiment as illustrated in FIG. 6, the hydraulic cylinders used in elements 41, 42, and 43 of FIG. 5 are replaced by the conventional wire and pulley mechanisms. In this manner, the length of the fore boom 53 and after boom 54 can be varied along the poles 51 and 52 which are connected to the articulate axis support structure 55. The pole 51 is divided into two parts at the articulate axis support structure 55, and each half can be independently rotated thereabout in the same manner as described in the previous embodiments.

Figure 7:
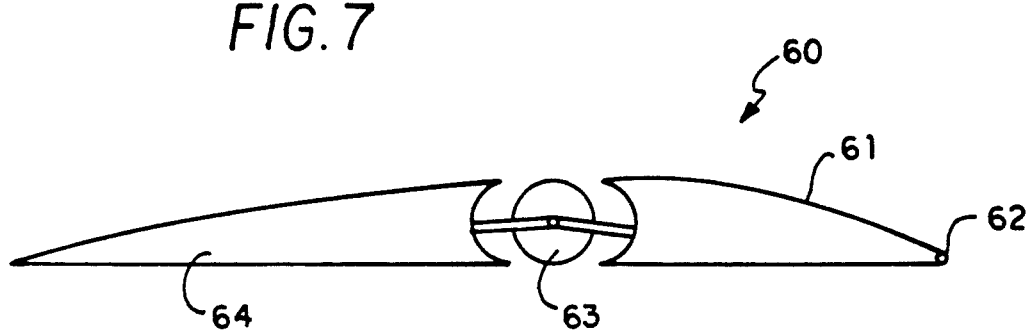
FIG. 7 is a side view of a fourth embodiment of the present invention.

In the embodiment of FIG. 7, the articulate wing mechanism 60 is made of a solid fore wing 61 with a leading edge deflector 62 which is an integral part of the fore wing 61. The interior portion of the wing 61 may be hollow or may be filled with a solid light weight material. The after wing 64 is a solid wing and may be filled with material or may be hollow in the same manner as the fore wing 61. Both the fore wing 61 and the after wing 64 are attached to the articulate wing support structure 63 in the same manner as described in the previous embodiments above. Further, the wings 61 and 64 are independently controlled in the same manner as discussed above using independent control actuators.

Figure 8:
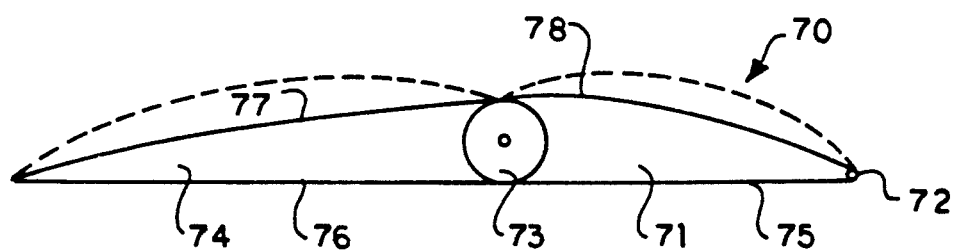
FIG. 8 is a side view of a fifth embodiment of the present invention.

In the embodiment of FIG. 8, the articulate wing 70 is made of flexible material. The lower fore wing portion 75 of the fore wing 71 and the lower after wing portion 76 of the after wing 74 are vented so as to allow the fluid pressure to fill the wing portions 71 and 74. In this manner the lift surfaces, e.i., the upper fore wing portion 78 and the upper after wing portion 77, are expanded to form a more convex surface. This provides for smoother fluid flow over the surface of the wing portions 77 and 78, thereby increasing the resultant lift as well as reducing drag. As in the previous embodiment, the wings 71 and 74 are independently rotated about the articulation axis support structure 73 in the same manner as discussed in the previous embodiments.

Figure 9:
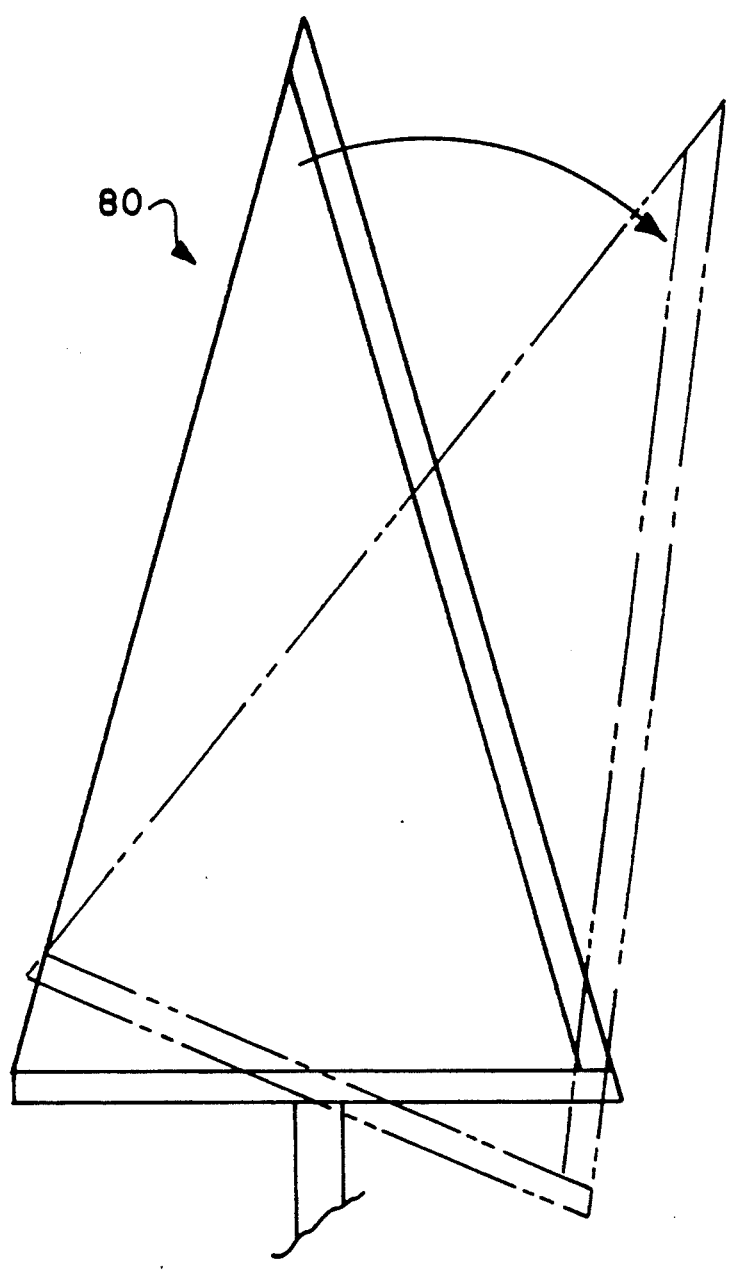
FIG. 9 is a side view of a sixth embodiment of the present invention.

As shown in FIG. 9, a wing 80 may be canted so as to produce lift forces in an upward direction. This ability may be utilized to produce greater stability in turbulence, greater upward lift to facilitate speed and a hydroplaning capability or as an additional braking system. The canting effect may be accomplished in any known manner, such as disclosed by Werner, Jr. U.S. Pat. No. 4,280,428, made of record and incorporated herein by reference.

Figure 10:
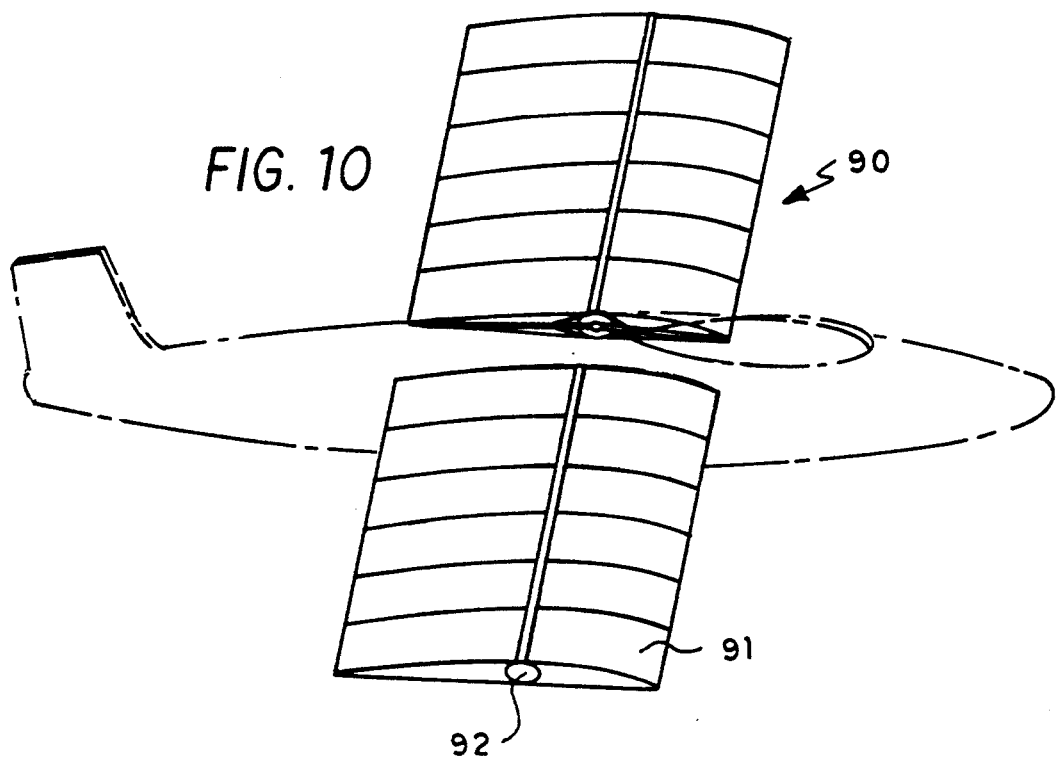
FIG. 10 is an environmental view of one possible application of the embodiments of the present invention.
Figure 11:
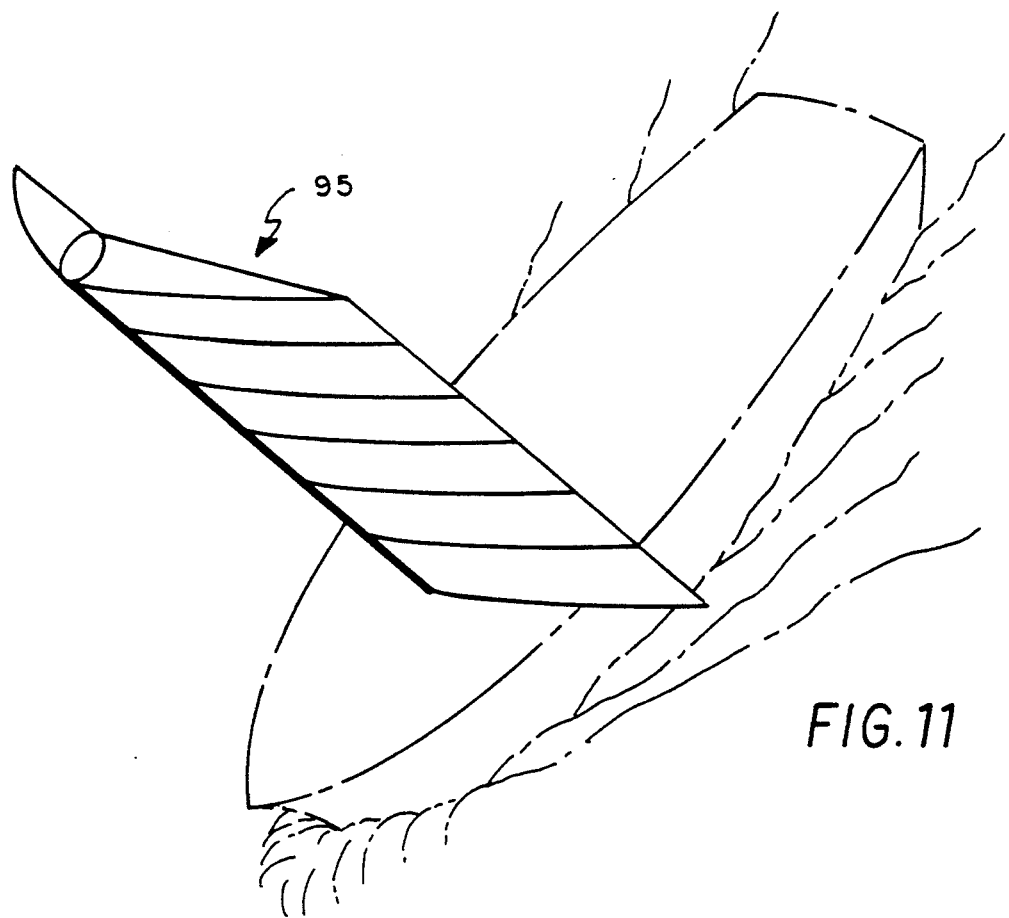
FIG. 11 is another environmental view of another possible application of the embodiment of the present invention.

As shown in FIG. 10, the articulated wing 90 may be used on an aircraft. The wing may be comprised of a plurality of wing portion 91 which overlap one another and may be expanded or retracted as the articulate wing support structure 92 is expanded or retracted. In this manner a variety of lift characteristics may be achieved for various fluid flow velocities as discussed above. Further, the wing could be used on a sailboat. In FIG. 11, a solid articulated wing 95 is utilized. Various features of the above embodiments may be mixed and matched in accordance with the desired characteristics the user wishes to achieve. For example, the sail in FIG. 11 could use the upward canting effect of the embodiment of FIG. 9 in order to achieve greater speeds or braking capabilities.

Figure 12:
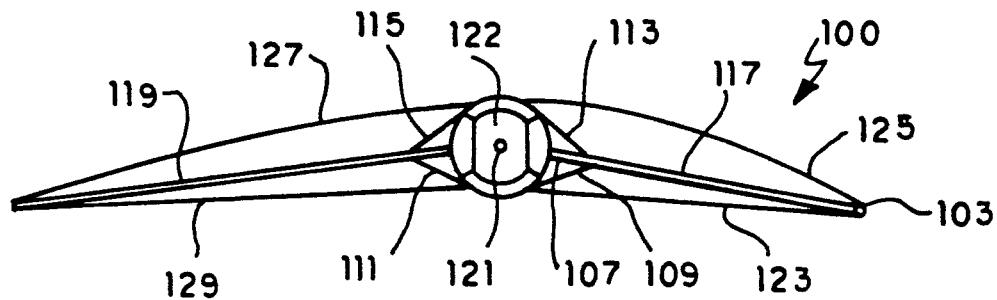
FIG. 12 is a side view of a seventh embodiment of the present invention having maximum wing width.
Figure 13:
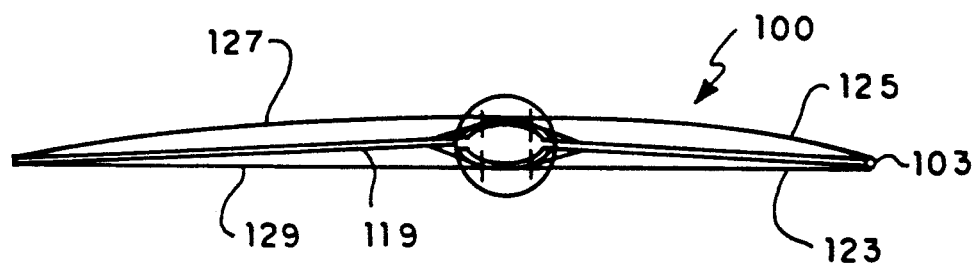
FIG. 13 is a side view of the seventh embodiment of the present invention having minimal wing width.

As shown in FIGS. 12 and 13, the width of the articulated wing structure 100 may be adjusted through the use of an actuator 122 connected to the axis support structure axis support structure 107. The leading edge deflector 103, axis support structure 107, control actuator 109, control actuator 111, control actuator 113, control actuator 115, fore boom 117, after boom 119, pivotal connection 121, front lower wing portion 123, front upper wing portion 125, rear upper wing portion 127, and rear lower wing portion 129 are similar to the elements 3, 7, 9, 11, 13, 15, 17, 19, 21, 23, 25, 27, and 29 of the articulated wing 1 shown in FIG. 1. The articulated wing structure 100 differs from the articulated wing 1 in that the articulated wing 100 includes an additional actuator 122 for expanding the width of the articulated wing structure but does not use a trailing edge portion found in the articulated wing structure 1.

The control actuator 122 is used to vary the width of the articulated wing structure 100. By expanding or retracting the control actuator 122 to vary the width of the wing 100, the lift to drag ratio may be varied. Therefore, increase potential control over the craft utilizing the wing 100 can be realized by allowing for the rapid increase or decrease of power due to the alteration of the lift to drag ratio, particularly of the leading edge.

The wing designs of the present invention could be used in a variety of environments as discussed above. The wing could be used in conjunction with power generators. In this instance, the wing could be used as the propellers of a windmill or the like used to generate electricity. The wing could be used to generate electrical energy by utilizing the force of the fluid flow found in areas of tidal activity, fluid currents (as found in oceans and rivers) and other areas of fluid convectional activity. The wing could be used as a motive force generator and for the control of attitude and direction in vehicles designed to operate in dense fluid mediums, such as submarines. The wing could be used as a rudder on ocean vessels, etc.

Modifications to the embodiments discussed above could be made without deviating from the scope of the invention. For example, in the wing 1 of FIG. 1, a second fore boom and a second after boom could be placed on the opposite side of the wing so as to add structural integrity to the wing. The fore and after booms could also extend along the length of the articulation axis support structure 7.

It is to be understood that the present invention is not limited to the sole embodiments described above, but encompasses any and all embodiments within the scope of the following claims.

I claim:

1. An articulated wing having a positive pressure surface and a negative pressure surface, comprising:
    an articulate axis support structure including a first side and a second side, wherein said first side is attached to a means for utilizing said articulated wing;
    a fore boom pivotally attached at a back end thereof to said articulate axis support structure, and having a front end thereof opposite said back end;
    an after boom pivotally attached at a front end thereof to said articulate axis support structure, and having a back end thereof opposite said front end thereof;
    a first wing surface portion having front and back ends thereof and forming a front part of said positive pressure surface;
    a second wing surface portion having front and back ends thereof and forming a front part of said negative pressure surface;
    a third wing surface portion having front and back ends thereof and forming a back part of said negative pressure surface;
    a fourth wing surface portion having front and back ends thereof and forming a back part of said positive pressure surface;
    first attachment means for attaching said front end of said first wing surface portion to said front end of said fore boom;
    second attachment means for attaching said back end of said first wing surface portion to said articulate axis support structure;
    third attachment means for attaching said front end of said second wing surface portion to said front end of said fore boom;
    fourth attachment means for attaching said back end of said second wing surface portion to said articulate axis support structure;
    fifth attachment means for attaching said front end of said third wing surface portion to said articulate axis support structure;
    sixth attachment means for attaching said back end of said third wing surface portion to said back end of said after boom;
    seventh attachment means for attaching said front end of said fourth wing surface portion to said articulate axis support structure;
    eighth attachment means for attaching said back end of said fourth wing surface portion to said back end of said after boom;
    a first actuation means for pivotally moving said fore boom about said articulated wing support structure at said first side thereof and at said second side thereof; and,
    a second actuation means for pivotally moving said after boom about said articulated wing support structure at said first side thereof and at said second side thereof,
    wherein said first actuation means and said second actuation means are independently operated.

2. An articulated wing as claimed in claim 1, wherein wherein a rigid leading edge is attached to said front end of said fore boom;
    wherein a rigid trailing edge is attached to said back end of said after boom.

3. An articulated wing as claimed in claim 1, wherein said first wing surface portion comprises a rigid surface;
    said second wing surface portion comprises a rigid surface;
    said third wing surface portion comprises a rigid surface; and
    said fourth wing surface portion comprises a rigid surface.

4. An articulated wing as claimed in claim 1, further comprising means for rotating said articulate axis support structure.

5. An articulated wing as claimed in claim 1, wherein said first actuation means comprises:
- a first hydraulic cylinder attached at a first end thereof to said first side of said articulate axis support structure and at a second end thereof to said fore boom; and
- a second hydraulic cylinder attached at a first end thereof to said second side of said articulate axis support structure and at a second end thereof to said fore boom.

6. An articulated wing as claimed in claim 5, wherein said second actuation means comprises:
- a third hydraulic cylinder attached at a first end thereof to said first side of said articulate axis support structure and at a second end thereof to said after boom; and
- a fourth hydraulic cylinder attached at a first end thereof to said second side of said articulate axis support structure and at a second end thereof to said after boom.

7. An articulated wing as claimed in claim 1, wherein said first actuation means comprises:
- a first pneumatic drive attached at a first end thereof to said first side of said articulate axis support structure and at a second end thereof to said fore boom; and
- a second pneumatic drive attached at a first end thereof to said second side of said articulate axis support structure and at a second end thereof to said fore boom.

8. An articulated wing as claimed in claim 7, wherein said second actuation means comprises:
- a third pneumatic drive attached at a first end thereof to said first side of said articulate axis support structure and at a second end thereof to said after boom; and
- a fourth pneumatic drive attached at a first end thereof to said second side of said articulate axis support structure and at a second end thereof to said after boom.

9. An articulated wing as claimed in claim 1, wherein said first actuation means comprises:
- a first electromagnetic servo mechanism attached at a first end thereof to said first side of said articulate axis support structure and at a second end thereof to said fore boom; and
- a second electromagnetic servo mechanism attached at a first end thereof to said second side of said articulate axis support structure and at a second end thereof to said fore boom.

10. An articulated wing as claimed in claim 9, wherein said second actuation means comprises:
- a third electromagnetic servo mechanism attached at a first end thereof to said first side of said articulate axis support structure and at a second end thereof to said after boom; and
- a fourth electromagnetic servo mechanism attached at a first end thereof to said second side of said articulate axis support structure and at a second end thereof to said after boom.

11. An articulated wing as claimed in claim 1, wherein said first actuation means comprises:
- a first line and pulley mechanism attached at a first end thereof to said first side of said articulate axis support structure and at a second end thereof to said fore boom; and
- a second line and pulley mechanism attached at a first end thereof to said second side of said articulate axis support structure and at a second end thereof to said fore boom.

12. An articulated wing as claimed in claim 11, wherein said second actuation means comprises:
- a third line and pulley mechanism attached at a first end thereof to said first side of said articulate axis support structure and at a second end thereof to said after boom; and
- a fourth line and pulley mechanism attached at a first end thereof to said second side of said articulate axis support structure and at a second end thereof to said after boom.

13. An articulated wing as claimed in claim 1, wherein said means for utilizing said articulated wing further comprising means for canting said wing for obtaining a lift with a vector direction along the length of said articulate axis support structure.

14. An articulated wing as claimed in claim 4, wherein said means for utilizing said articulated wing further comprising means for canting said wing for obtaining a lift with a vector direction along the length of said articulate axis support structure.

15. An articulated wing as claimed in claim 1, further comprising;
- means for selectively extending and retracting said articulated wing support structure;
- means for selectively extending and retracting said fore boom; and,
- means for selectively extending and retracting said after boom.

16. An articulated wing as claimed in claim 4, further comprising;
- means for selectively extending and retracting said articulated wing support structure;
- means for selectively extending and retracting said fore boom; and,
- means for selectively extending and retracting said after boom.

17. An articulated wing as claimed in claim 1, further comprising means for varying the width thereof.

18. An articulated wing as claimed in claim 4, further comprising means for varying the width thereof.

19. An articulated wing as claimed in claim 13, further comprising means for varying the width thereof.

20. An articulated wing as claimed in claim 1, wherein
- said first wing surface portion comprises a flat and rigid surface;
- said second wing surface portion comprises a rigid surface;
- said third wing surface portion comprises a flat and rigid surface; and
- said fourth wing surface portion comprises a flat and rigid surface.

* * * * *